3,544,575
2,4-DIOXOTETRAHYDROQUINAZOLINES
Guenter Scheuerer and Adolf Zeidler, Ludwigshafen (Rhine), and Adolf Fischer, Mutterstadt, Pfalz, Germany, assignors to Badische Anilin- & Soda-Fabrik Aktiengesellschaft, Ludwigshafen (Rhine), Germany
No Drawing. Continuation-in-part of application Ser. No. 447,912, Apr. 13, 1965. This application July 17, 1967, Ser. No. 653,608
Claims priority, application Germany, Apr. 20, 1964, B 76,408; Mar. 31, 1965, B 81,248
Int. Cl. C07d 51/30
U.S. Cl. 260—260　　　　　　　　　　　　　2 Claims

ABSTRACT OF THE DISCLOSURE

Substituted 2,4-dioxotetrahydroquinazolines having the formula

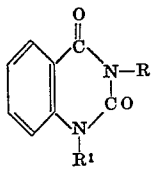

in which R denotes a linear or branched lower alkyl or alkenyl group which may bear a chlorine atom, a hydroxy group or an alkoxy group as a substituent, and $R^1$ denotes the grouping —$(CO)_n$—A in which $n$ denotes zero or 1 and A denotes a linear or branched alkyl, alkenyl or cycloalkyl group, which may bear chlorine atoms, methyl groups or phenoxy groups as substituents, or a phenyl group which may bear chlorine atoms, bromine atoms or nitro groups as substituents, or the cyclohexyl or decahydronaphthyl group. The subject compounds are highly effective when used as plant growth regulators and for controlling undesirable vegetation.

---

This application is a continuation-in-part of our co-pending application Ser. No. 447,912, filed Apr. 13, 1965 and now abandoned.

The present invention relates to substituted 2,4-dioxotetrahydroquinazolines, particularly 2,4-dioxotetrahydroquinazolines substituted in the 1- and 3-positions, which have valuable properties.

It is known that salts of 2-methyl-4-chlorophenoxyacetic acid, particularly the water-soluble potassium salt, may be used as selective herbicides. It is also known that 2-chloro-4,6-bis-(ethylamino)-s-triazine may be used as a total herbicide, However, their action is not satisfactory.

An object of the present invention is to provide new compounds which have an excellent selective and total herbicidal action. A further object of the invention is to provide new, valuable 2,4-dioxotetrahydroquinazolines. These and other objects are achieved with derivatives of 2,4 - dioxotetrahydroquinazolines (which may also be called 2,4-quinazolinediones or benzoylenureas) having the formula

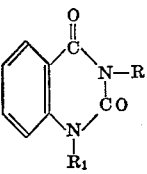

in which R denotes a linear or branched lower alkyl or alkenyl group which may bear a chlorine atom, a hydroxy group or an alkoxy group as a substituent, and $R^1$ denotes the grouping —$(CO)_n$—A in which $n$ denotes zero or 1 and A denotes a linear or branched alkyl, alkenyl or cycloalkyl group, which may bear chlorine atoms, methyl groups or phenoxy groups as substituents, or a phenyl group which may bear chlorine atoms, bromine atoms or nitro groups as substituents, or the cyclohexyl or decahydronaphthyl group. They are suitable as plant growth regulants and for controlling undesirable vegetation.

The following may be given as examples of active substances according to this invention:

1-methyl-3-isopropyl-2,4-dioxotetrahydroquinazoline,
1-ethyl-3-isopropyl-2,4-dioxotetrahydraquinazoline,
1-acetyl-3-isopropyl-2,4-dioxotetrahydroquinazoline,
1-propionyl-3-isopropyl-2,4-dioxotetrahydroquinazoline,
1-butyryl-3-isopropyl-2,4-dioxotetrahydroquinazoline,
1-isobutyryl-3-isopropyl-2,4-dioxotetrahydroquinazoline,
1-methylethylacetyl-3-isopropyl-2,4-dioxotetrahydroquinazoline,
1-methylpropylacetyl-3-isopropyl-2,4-dioxotetrahydroquinazoline,
1-ethylbutylacetyl-3-isopropyl-2,4-dioxotetrahydroquinazoline,
1-(2,2,4,4-tetramethylvaleroyl)-3-isopropyl-2,4-dioxotetrahydroquinazoline,
1-dimethylethylacetyl-3-isopropyl-2,4-dioxotetrahydroquinazoline,
1-dimethylpropylacetyl-3-isopropyl-2,4-dioxotetrahydroquinazoline,
1-dimethylethylbutylacetyl-3-isopropyl-2,4-dioxotetrahydroquinazoline,
1-ω-chlorocaproyl-3-isopropyl-2,4-dioxotetrahydroquinazoline,
1-cyclopropanoyl-3-isopropyl-2,4-dioxotetrahydroquinazoline,
1-caproyl-3-isopropyl-2,4-dioxotetrahydroquinazoline,
1-caprylyl-3-isopropyl-2,4-dioxotetrahydroquinazoline,
1-lauroyl-3-isopropyl-2,4-dioxotetrahydroquinazoline,
1-crotonyl-3-isopropyl-2,4-dioxotetrahydroquinazoline,
1-dimethylacryl-3-isopropyl-2,4-dioxotetrahydroquinazoline,
1-cyclopentanoyl-3-isopropyl-2,4-dioxotetrahydroquinazoline,
1-(1-methylcyclopentanoyl)-3-isopropyl-2,4-dioxotetrahydroquinazoline,
1-cyclohexanoyl-3-isopropyl-2,4-dioxotetrahydroquinazoline,
1-(1-methylcyclohexanoyl)-3-isopropyl-2,4-dioxotetrahydroquinazoline,
1-cyclohexene-1-oyl-3-isopropyl-2,4-dioxotetrahydroquinazoline,
1-decahydronaphthyl-9-oyl-3-isopropyl-2,4-dioxotetrahydroquinazoline,
1-benzoyl-3-isopropyl-2,4-dioxotetrahydroquinazoline,
1-o-chlorobenzoyl-3-isopropyl-2,4-dioxotetrahydroquinazoline,
1-m-chlorobenzoyl-3-isopropyl-2,4-dioxotetrahydroquinazoline,
1-p-chlorobenzoyl-3-isopropyl-2,4-dioxotetrahydroquinazoline,
1-p-bromobenzoyl-3-isopropyl-2,4-dioxotetrahydroquinazoline,
1-(2,4-dichlorobenzoyl)-3-isopropyl-2,4-dioxotetrahydroquinazoline,
1-p-nitrobenzoyl-3-isopropyl-2,4-dioxotetrahydroquinazoline,
1-(2-chloro-5-nitrobenzoyl)-3-isopropyl-2,4-dioxotetrahydroquinazoline,
1-phenoxyacetyl-3-isopropyl-2,4-dioxotetrahydroquinazoline,
1-acetyl-3-sec-butyl-2,4-dioxotetrahydroquinazoline,
1-butyryl-3-sec-butyl-2,4-dioxotetrahydroquinazoline, 1-isobutyryl-3-sec-butyl-2,4-dioxotetrahydroquinazoline,
1-acetyl-3-ω-chloroethyl-2,4-dioxotetrahydroquinazoline,
1-isobutyryl-3-ω-chloroethyl-2,4-dioxotetrahydro-
  quinazoline,
1-acetyl-3-propyl-2,4-dioxotetrahydroquinazoline,
1-propionyl-3-propyl-2,4-dioxotetrahydroquinazoline,
1-butyryl-3-propyl-2,4-dioxotetrahydroquinazoline,
1-isobutyryl-3-propyl-2,4-dioxotetrahydroquinazoline,
1-methylethylacetyl-3-propyl-2,4-dioxotetrahydro-
  quinazoline,
1-ethylbutylacetyl-3-propyl-2,4-dioxotetrahydro-
  quinazoline,
1-methylethylbutylacetyl-3-propyl-2,4-dioxotetrahydro-
  quinazoline,
1-crotonyl-3-propyl-2,4-dioxotetrahydroquinazoline,
1-acetyl-3-ω-methoxypropyl-2,4-dioxotetrahydro-
  quinazoline,
1-propionyl-3-ω-methoxypropyl-2,4-dioxotetrahydro-
  quinazoline,
1-butyryl-3-ω-methoxypropyl-2,4-dioxotetrahydro-
  quinazoline,
1-isobutyryl-3-ω-methoxypropyl-2,4-dioxotetrahydro-
  quinazoline,
1-methylethylacetyl-3-ω-methoxypropyl-2,4-dioxotetra-
  hydroquinazoline,
1-ethylbutylacetyl-3-ω-methoxypropyl-2,4-dioxotetra-
  hydroquinazoline,
1-acetyl-3-allyl-2,4-dioxotetrahydroquinazoline,
1-propionyl-3-allyl-2,4-dioxotetrahydroquinazoline,
1-isobutyryl-3-allyl-2,4-dioxotetrahydroquinazoline,
1-butyryl-3-isobutyl-2,4-dioxotetrahydroquinazoline,
1-isobutyryl-3-isobutyl-2,4-dioxotetrahydroquinazoline,
1-methylethylacetyl-3-isobutyl-2,4-dioxotetrahydro-
  quinazoline,
1-crotonyl-3-isobutyl-2,4-dioxotetrahydroquinazoline.

The following possible method of production may be mentioned:

(1) Alkylation of 3-alkyl-2,4-dioxotetrahydroquinazolines with alkyl halides, particularly alkyl bromides and alkyl iodides (J. Indian Chem. Soc. 40 (1963), 35–38).

(2) Acylation of 3-alkyl-2,4-dioxotetrahydroquinazolines with acid chlorides in the presence of agents which bind hydrogen chloride.

The production of the compounds is carried out as follows:

(a) Production of 1-isobutyryl-3-isopropyl-2,4-dioxotetrahydroquinazoline.—20.4 parts (parts by weight) of 3-isopropyl-2,4-dioxotetrahydroquinazoline (J. Org. Chem. 26 (1961), 5238, J. Org. Chem. 18 (1953) 1427) and 12.2 parts of triethylamine are heated in 400 parts of toluene to 80° C. At this temperature 11.7 parts of isobutyryl chloride is dripped into the clear solution and the mixture is kept for a further 8 hours at 80° C. After cooling, the triethylamine hydrochloride which has separated out is suction filtered. The filtrate is then washed three times, once with 100 parts of 1 N hydrochloric acid and twice with 100 parts of water, dried with anhydrous sodium sulfate and evaporated in the vacuum of a water-jet pump. There remains 27 parts of a yellow oil which is distilled in a high vacuum for purification. At a vacuum of 0.2 mm. Hg 25 parts of a colorless, viscous fluid having a refractive index $n_D^{25}=1.5493$ is obtained at 153° C.

All other 1-acyl-3-alkyl-2,4-dioxotetrahydroquinazolines may be synthesized in an analogous manner.

(b) Production of 1-ethyl-3-isopropyl-2,4-dioxotetrahydroquinazoline.—A solution of 5.4 parts (parts by weight) in 20 parts of dry methanol is added to 20.4 parts of 3-isopropyl-2,4-dioxotetrahydroquinazoline dissolved in 250 parts of dry methanol. After boiling for 15 minutes under reflux the methanol is evaporated off in vacuo and the white residue is suspended in 200 parts of acetonitrile. After adding 15.5 parts of ethyl iodide the mixture is boiled for a further 8 hours under reflux and the acetonitrile is then evaporated off in vacuo. The residue is stirred with 100 parts of water and filtered off. Afterwards the water-insoluble residue is recrystallized from 70% aqueous ethanol. 18 parts of white crystals having a melting point of 79° to 80° C. are obtained.

All other 1,3-dialkyl-2,4-dioxotetrahydroquinazolines may be manufactured in an analogous manner.

The melting points (F.P.) or boiling points (K.P.$_{mm. Hg}$) of the new substituted 2,4-dioxotetrahydroquinazolines are given in the following list, with their refractive indexes. The substituents R and R$^1$ in the formula

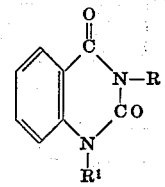

are also given in the list.

| R | R$_1$ | F.P. (° C.) | $n_D$ |
|---|---|---|---|
| CH$_3$\<br>　　＞CH—<br>CH$_3$／ | CH$_3$— | 104 to 105 | |
| Same as above | C$_2$H$_5$— | 79 to 80 | |
| Do | CH$_3$—CO— | 128 to 130 | |
| Do | C$_2$H$_5$—CO— | 98 to 100 | |
| Do | C$_3$H$_7$—CO— | K.P.$_{0.1}$=152° C. | $n_D^{25}$=1.5425 |
| Do | CH$_3$\<br>　　＞CH—CO—<br>CH$_3$／ | K.P.$_{0.2}$=153° C. | $n_D^{25}$=1.5493 |
| Do | CH$_3$\<br>　　＞CH—CO—<br>C$_2$H$_5$／ | K.P.$_{0.2}$=159° C. | $n_D^{25}$=1.5448 |
| Do | CH$_3$\<br>　　＞CH—CO—<br>C$_3$H$_7$／ | K.P.$_{0.2}$=180° C. | $n_D^{25}$=1.5438 |
| Do | C$_2$H$_5$\<br>　　＞CH—CO—<br>C$_4$H$_9$／ | K.P.$_{0.2}$=178° C. | $n_D^{25}$=1.5312 |
| Do | CH$_3$　　　CH$_3$<br>　\|　　　　\|<br>CH$_3$—C—CH$_2$—C—CO—<br>　\|　　　　\|<br>CH$_3$　　　CH$_3$ | 99 | |
| Do | CH$_3$\<br>　　＞C—CO—<br>C$_2$H$_5$／ | 79 | |

| R | R₁ | F.P. (° C.) | $n_D$ |
|---|---|---|---|
| $\begin{array}{c}CH_3\\ \phantom{x}\diagdown\\ CH-\\ \phantom{x}\diagup\\ CH_3\end{array}$ | $\begin{array}{c}CH_3\\ \phantom{x}\diagdown\\ CH_3-C-CO-\\ \phantom{x}\diagup\\ C_3H_7\end{array}$ | K.P.$_{0.3}$=187° C. | $n_D^{25}$=1.5368 |
| Same as above | $\begin{array}{c}CH_3\\ \phantom{x}\diagdown\\ C_2H_5-C-CO-\\ \phantom{x}\diagup\\ C_4H_9\end{array}$ | K.P.$_{0.1}$=158° C. | $n_D^{25}$=1.5275 |
| Do | Cl—(CH₂)₅—CO— | 162 | |
| Do | $\begin{array}{c}H_2C\\ \phantom{x}\diagdown\\ \phantom{xxx}CH-CO-\\ \phantom{x}\diagup\\ H_2C\end{array}$ | 52 to 55 | |
| Do | CH₃—CH=CH—CO— | K.P.$_{0.2}$=173° C. | $n_D^{25}$=1.5690 |
| Do | $\begin{array}{c}CH_3\\ \phantom{x}\diagdown\\ C=CH\ CO-\\ \phantom{x}\diagup\\ CH_3\end{array}$ | K.P.$_{0.2}$=169° C. | $n_D^{25}$=1.5688 |
| Do | cyclopentyl-C(CH₃)(H)—CO— | K.P.$_{0.1}$=151° C. | $n_D^{25}$=1.5503 |
| Do | cyclohexyl(H)—CO— | K.P.$_{0.1}$=151° C. | $n_D^{25}$=1.5520 |
| Do | cyclohexyl-C(CH₃)(H)—CO— | K.P.$_{0.1}$=163° C. | $n_D^{25}$=1.5485 |
| Do | cyclohexenyl—CO— | K.P.$_{0.3}$=185° C. | $n_L^{25}$=1.5721 |
| Do | decahydronaphthyl—CO | P.K.$_{0.1}$=165° C. | $n_D^{25}$=1.5616 |
| Do | C₆H₅—CO— | K.P.$_{0.05}$=155 to 160° C. | |
| Do | 2-Cl-C₆H₄—CO— | K.P.$_{0.2}$=203° C. | $n_D^{25}$=1.6050 |
| Do | 3-Cl-C₆H₄—CO— | K.P.$_{0.2}$=203° C. | $n_D^{40}$=1.6010 |
| Do | Cl—C₆H₄—CO— | 128 | |
| Do | Br—C₆H₄—CO— | 134 | |
| Do | 2,4-Cl₂-C₆H₃—CO— | K.P.$_{0.2}$=188° C. | $n_D^{40}$=1.6112 |
| Do | O₂N—C₆H₄—CO— | 158 | |
| Do | 3-NO₂-4-Cl-C₆H₃—CO— | 163 | |
| Do | C₆H₅—O—CH₂—CO— | K.P.$_{0.2}$=202° C. | |
| $\begin{array}{c}C_2H_5\\ \phantom{x}\diagdown\\ CH-\\ \phantom{x}\diagup\\ CH_3\end{array}$ | CH₃—CO— | 68 | |

| R | R₁ | F.P. (° C.) | $n_D$ |
|---|---|---|---|
| $C_2H_5$<br>$\phantom{XX}$CH—<br>$CH_3$ | $CH_3$<br>$\phantom{XX}$CH—CO—<br>$CH_3$ | K.P.$_{0.1}$=137° C. | $n_D^{25}$=1.5455 |
| Same as above | $C_3H_7$—CO— | K.P.$_{0.2}$=154° C. | $n_D^{25}$=1.5448 |
| Cl—CH₂—CH₂— | $CH_3$—CO— | 151 | |
| Cl—CH₂—CH₂— | $CH_3$<br>$\phantom{XX}$CH—CO—<br>$CH_3$ | 97 | |
| CH₃—CH₂—CH₂— | $CH_3$—CO— | 105 | |
| Same as above | $C_2H_5$—CO— | 122 | |
| Do | $C_3H_7$—CO— | 64 to 66 | |
| Do | $CH_3$<br>$\phantom{XX}$CH—CO—<br>$CH_3$ | 86 to 88 | |
| Do | $CH_3$<br>$\phantom{XX}$CH—CO—<br>$C_2H_5$ | 60 to 62 | |
| Do | $C_2H_5$<br>$\phantom{XX}$CH—CO—<br>$C_4H_9$ | | $n_D^{25}$=1.5181 |
| Do | $CH_3$<br>$\phantom{XX}$C₂H₅—C—CO—<br>$C_4H_9$ | | $n_D^{25}$=1.5221 |
| Do | CH₃—CH=CH—CO— | 95 to 96 | |
| CH₃—O—CH₂—CH₂—CH₂— | CH₃—CO | 83 | |
| Same as above | C₂H₅—CO | 53 to 55 | |
| Do | C₃H₇—CO | 54 to 56 | |
| Do | $CH_3$<br>$\phantom{XX}$CH—CO<br>$CH_3$ | 60 to 62 | |
| Do | $CH_3$<br>$\phantom{XX}$CH—CO<br>$C_2H_5$ | 65 | |
| Do | $C_2H_5$<br>$\phantom{XX}$CH—CO<br>$C_4H_9$ | | $n_D^{25}$=1.5219 |
| CH₂=CH—CH₂— | CH₃—CO— | 85 to 88 | |
| Same as above | C₂H₅—CO— | 56 to 57 | |
| Do | $CH_3$<br>$\phantom{XX}$CH—CO—<br>$CH_3$ | 91 to 93 | |
| $CH_3$<br>$\phantom{XX}$CH—CH₂—<br>$CH_3$ | C₃H₇—CO— | 110 | |
| Same as above | $CH_3$<br>$\phantom{XX}$CH—CO—<br>$CH_3$ | 58 to 59 | |
| Do | $CH_3$<br>$\phantom{XX}$CH—CO—<br>$C_2H_5$ | 87 to 88 | |
| Do | CH₃—CH=CH—CO— | 83 to 84 | |
| Do | C₂H₅—CO— | 82 | |
| Do | C₆H₅— | 94 to 96 | |
| Do | $C_3H_7$<br>$\phantom{XX}$CH—CO—<br>$CH_3$ | 87 to 88 | |

Substituted 2,4-dioxotetrahydroquinazolines are solid crystalline substances or viscous liquids which are quite stable chemically and thermally.

The active substances may be converted into the herbicidal mixtures by conventional methods by mixing with conventional solid or liquid extenders, solvents, emulsifying agents, dispersing agents or other assistants. Examples of such assistants are water, or water and wetting agent, or organic solvents, or solid fertilizers, or clay, or diatomaceous earth.

The herbicidal mixtures are suitable for selective control of weeds in cereal crops and for the total destruction of undesired plants, for example on railway embankments, roads and paths.

It is also possible to add insecticides, fungicides, bactericides and other herbicides, and to mix with fertilizers.

The invention is illustrated by the following examples of the use of the herbicides according to this invention.

EXAMPLE 1

Seeds of barley (*Hordeum vulgare*), wheat (*Triticum vulgare*), Indian corn (*Zea mays*), potatoes (*Solanum tuberosum*), annual meadow grass (*Poa annua*), slender foxtail (*Alopecurus myosuroides*), wild mustard (*Sinapis arvensis*), chickweed (*Stellaria media*), camomile (*Matricaria chamomilla*) and cleavers (*Galium aparine*) are sown in plastics pots having a diameter of 8 cm. in a greenhouse. They are treated on the same day with 1 - acetyl-3-isopropyl-2,4-dioxotetrahydroquinazoline (I), 1-butyryl-3-isopropyl-2,4-dioxotetrahydroquinazoline (II) and, for comparison, with the potassium salt of 2-methyl-4-chlorophenoxyacetic acid (III). The rate of application in each case is 1.5 kg. of active substance per hectare dispersed or dissolved in an amount of water equivalent to 500 litres per hectare. Four weeks later it is seen that I and II have a greater herbicidal action than III.

The results are given in the following table in which 0 denotes no action and 100 denotes total destruction of the plants.

|  | Active substance | | |
|---|---|---|---|
|  | I | II | III |
| Barley | 0 | 0 | 10 |
| Wheat | 0 | 0 | 10 |
| Indian corn | 0 | 0 | 30-40 |
| Potatoes | 0 | 0 | 10 |
| Annual meadow grass | 60 | 80 | 10 |
| Slender foxtail | 50-60 | 70-80 | 10-20 |
| Wild mustard | 100 | 100 | 80-90 |
| Chickweed | 80 | 90-100 | 10-20 |
| Camomile | 80 | 70-80 | 40-50 |
| Cleavers | 50 | 70-80 | 0 |

The following active substances have the same biological action as I and II:

1-propionyl-3-isopropyl-2,4-dioxotetrahydroquinazoline,
1-isobutyryl-3-isopropyl-2,4-dioxotetrahydroquinazoline,
1-crotonyl-3-isopropyl-2,4-dioxotetrahydroquinazoline,
1-methylethylacetyl-3-isopropyl 2,4-dioxotetrahydroquinazoline,
1-butylethylacetyl-3-isopropyl-2,4-dioxotetrahydroquinazoline,
1-methylethylbutylacetyl-3-isopropyl-2,4-dioxotetrahydroquinazoline,
1-(2,4-dichlorobenzoyl)-3-isopropyl-2,4-dioxotetrahydroquinazoline,
1-dimethylacryl-3-isobutyl-2,4-dioxotetrahydroquinazoline,
1-cyclopropanoyl-3-isobutyl-2,4-dioxotetrahydroquinazoline,
1-benzoyl-3-allyl-2,4-dioxotetrahydroquinazoline, and
1-phenoxyacetyl-3-allyl-2,4-dioxotetrahydroquinazoline.

EXAMPLE 2

The plants wheat (*Triticum vulgare*), Indian corn (*Zea mays*), potatoes (*Solanum tuberosum*), annual meadow grass (*Poa annua*), slender foxtail (*Alopecurus myosuroides*), wild mustard (*Sinapis arvensis*), chickweed (*Stellaria media*), camomile (*Matricaria chamomilla*), common goosefoot (*Chenopodium album*), cleavers (*Galium aparine*) are treated at a growth height of 4 to 17 cm. with 1 - acetyl - 3 - isopropyl - 2,4 - dioxotetrahydroquinazoline (I), 1 - butyryl - 3 - isopropyl - 2,4-dioxotetrahydroquinazoline (II) and, for comparison, with the potassium salt of 2 - methyl - 4 - chlorophenoxyacetic acid (III). The rate of application in each case is 1.5 kg. of active substance dispersed or dissolved in an amount of water equivalent to 500 litres per hectare. Three weeks later, it is seen that I and II have a much better herbicidal action than III, particularly on chickweed, camomile, cleavers, annual meadow grass and slender foxtail.

Experimental results are given in the following table in which 0 denotes no action and 100 denotes total destruction of the plants.

|  | Active substance | | |
|---|---|---|---|
|  | I | II | III |
| Wheat | 0 | 0-10 | 0 |
| Indian corn | 0 | 0-10 | 30 |
| Potatoes | 0 | 0 | 30-40 |
| Annual meadow grass | 40-50 | 70-80 | 0 |
| Slender foxtail | 40 | 60-70 | 0-10 |
| Wild mustard | 100 | 100 | 90-100 |
| Chickweed | 80 | 90-100 | 10-20 |
| Common goosefoot | 90-100 | 100 | 90-100 |
| Camomile | 40-50 | 80 | 10-20 |
| Cleavers | 60 | 80 | 0 |

The active substances listed at the end of Example 1 have the same biological activity as I and II.

EXAMPLE 3

An experimental area which has been sown with wild mustard (*Sinapis arvensis*), chickweed (*Stellaria media*), camomile (*Matricaria chamomilla*), gallant soldier (*Galinsoga parviflora*), small nettle (*Urtica urens*), common goosefoot (*Chenopodium album*), cleavers (*Galium aparine*) and annual meadow grass (*Poa annua*) is treated on the day of sowing with 1 - butyryl - 3 - isopropyl - 2,4 - dioxotetrahydroquinazoline (I) and, for comparison, with 2 - chloro - 4,6 - bis - (ethylamino)-s-triazine (II). The rate of application is 4 kg. per hectare of active substance in each case, dispersed in an amount of water equivalent to 500 litres per hectare. After the weeds and weed grasses have emerged, it may be seen that I has a stronger action than II.

The same biological activity as I is shown by the active substances listed at the end of Example 1 and by 1 - acetyl - 3 - isopropyl - 2,4 - dioxotetrahydroquinazoline.

EXAMPLE 4

Agricultural land which is overgrown with wild mustard (*Sinapis arvensis*), chickweed (*Stellaria media*), camomile *Matricaria chamomilla*), sorrel (*Rumex* spp.), gallant soldier (*Galinsoga parviflora*), small nettle (*Urtica urens*), common goosefoot (*Chenopodium album*), cleavers (*Galium aparine*) and annual meadow grass (*Poa annua*) is treated with 1 - butyryl - 3 - isopropyl-2,4 - dioxotetrahydroquinazoline (I) and, for comparison, 2 - chloro - 4,6 - bis - (ethylamino) - s - triazine (II) at the rate of 3 kg. of active substance per hectare. The active substances are dispersed in an amount of water equivalent to 500 litres per hectare. At the time of the treatment, the weeds and weed grasses have a growth height of 5 to 10 cm. After a few days, the plants treated with I exhibit a good action of the herbicide, while the weeds and weed grasses on the area treated with II exhibit normal growth. Three to four weeks later, almost all dicotyledonous weeds and weed grasses have been completely destroyed.

A similar biological action to that of I is exerted by the active substances listed at the end of Example 1 and 1 - acetyl - 3 - isopropyl - 2,4 - dioxotetrahydroquinazoline.

EXAMPLE 5

Seeds of barley (*Hordeum vulgare*), wheat (*Triticum vulgare*), Indian corn (*Zea mays*), potatoes (*Solanum tuberosum*), wild mustard (*Sinapis arvensis*), chickweed (*Stellaria media*), small nettle (*Urtica urens*), cleavers (*Galium aparine*), annual meadow grass (*Poa annua*) are sown in a greenhouse in plastics pots having a diameter of 8 cm. and on the same day treated with 1 - methyl-3-isopropyl - 2,4 - dioxotetrahydroquinazoline (I), 1-ethyl-3 - isopropyl - 2,4 - dioxotetrahydroquinazoline (II) and, for comparison, with the potassium salt of 2 - methyl-4-chlorophenoxyacetic acid (III). The rate of application is in each case 2 kg. of active substance per hectare dispersed or dissolved in an amount of water equivalent to 500 litres per hectare. Four weeks later it is seen that I and II have a stronger herbicidal action than III.

The results are given in the following table in which 0 denotes no action and 100 denotes total destruction of the plants.

|  | Active substance | | |
|---|---|---|---|
|  | I | II | III |
| Barley | 0 | 0 | 10 |
| Wheat | 0 | 10 | 15 |
| Indian corn | 0 | 0 | 40 |
| Potatoes | 0 | 0 | 10–15 |
| Wild mustard | 80–100 | 100 | 80–100 |
| Chickweed | 70 | 80–90 | 30 |
| Small nettle | 80 | 80–90 | 60–70 |
| Cleavers | 50–60 | 70–80 | 0 |
| Annual meadow grass | 50–60 | 60–70 | 10–20 |

The following active substances have the same biological activity as I and II; 1-methyl-3-isobutyl-2,4-dioxotetrahydroquinazoline and 1-ethyl-3-allyl-2,4-dioxotetrahydroquinazoline.

EXAMPLE 6

The plants wheat (*Triticum vulgare*), barley (*Hordeum vulgare*), Indian corn (*Zea mays*), wild mustard (*Sinapis arvensis*), chickweed (*Stellaria media*), cleavers (*Galium aparine*) and annual meadow grass (*Poa annua*) are treated at a growth height of 4 to 17 cm. with 1-methyl-3-isopropyl-2,4-dioxotetrahydroquinazoline (I), 1-ethyl-3-isopropyl-2,4-dioxotetrahydroquinazoline (II) and, for comparison, with the potassium salt of 2-methyl-4-chlorophenoxyacetic acid (III). The rate of application in each case is 2 kg. of active substance per hectare, dispersed or dissolved in an amount of water equivalent to 500 litres per hectare. Three weeks later it is found that I and II have a much better herbicidal action than III.

Experimental results are given in the following table in which 0 denotes no action and 100 denotes that all plants are completely destroyed.

|  | Active substance | | |
|---|---|---|---|
|  | I | II | III |
| Wheat | 0–10 | 0 | 0–10 |
| Barley | 10 | 10 | 10 |
| Indian corn | 0 | 0 | 30–40 |
| Wild mustard | 100 | 100 | 100 |
| Chickweed | 70–80 | 90–100 | 20–30 |
| Cleavers | 60 | 70–80 | 0 |
| Annual meadow grass | 50–60 | 70–80 | 0 |

1-methyl-3-isobutyl-2,4-dioxotetrahydroquinazoline and 1-ethyl-3-allyl-2,4-dioxotetrahydroquinazoline have the same biological activity as I and II.

EXAMPLE 7

An experimental area, which has been sown with common goosefoot (*Chenopodium album*), wild mustard (*Sinapis arvensis*), chickweed (*Stellaria media*), small nettle (*Urtica urens*), cleavers (*Galium aparine*), annual meadow grass (*Poa annua*) is treated on the day of sowing with 1-ethyl-3-isopropyl - 2,4 - dioxotetrahydroquinazoline (I) and, for comparison, with 2-chloro-4,6-bis-(ethylamino)-s-triazine (II). The rate of application in each case is 5 kg. of active substance per hectare, dispersed in an amount of water equivalent to 500 liters per hectare. Eight days after emergence of the weeds and weed grasses it may be observed that I shows a stronger herbicidal action than II.

1-methyl-3-isobutyl-2,4-dioxotetrahydroquinazoline and 1 - ethyl-3-allyl-2,4-dioxotetrahydroquinazoline have the same biological activity as I.

EXAMPLE 8

Agricultural land, which is overgrown with common goosefoot (*Chenopodium album*), wild mustard (*Sinapis arvensis*), chickweed (*Stellaria media*), small nettle (*Urtica urens*), cleavers (*Galium aparine*), annual meadow grass (*Poa annua*) is sprayed with 1-ethyl-3-isopropyl-2,4-dioxotetrahydroquinazoline (I) and, for comparison, with 2-chloro-4,6-bis-(ethylamino)-s-triazine (II) at a rate of 5 kg. of active substance per hectare. The active substances are dispersed in an amount of water equivalent to 500 liters per hectare. The weeds and weed grasses have reached a growth height of 5 to 10 cm. at the time of treatment. Some days later it can be seen that I has had a good action on the plants, whereas the weeds and weed grasses on the area treated with II show normal growth. Three to four weeks later, almost all dicotyledonous weeds and weed grasses have been totally destroyed.

1-methyl-3-isobutyl-2,4-dioxotetrahydroquinazoline and 1 - ethyl-3-allyl-2,4-dioxotetrahydroquinazoline have the same biological activity as I.

We claim:

1. A substituted quinazoline having the formula

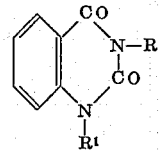

in which R is a member selected from the group consisting of linear and branched unsubstituted lower alkyl and lower alkenyl and chlorine-, hydroxyl- and alkoxy-substituted lower alkyl and lower alkenyl, and $R^1$ is the group —$(CO)_n$—A in which $n$ is 1 and A is a member selected from the group consisting of lower alkyl, lower alkenyl, cycloalkyl of 5 to 10 carbon atoms and chlorine-, methyl- and phenoxy-substituted lower alkyl, lower alkenyl and cycloalkyl of 5 to 10 ring carbon atoms, unsubstituted phenyl, and chlorine-, bromine- and $NO_2$-substituted phenyl.

2. 1-acetyl-3-isopropyl-2,4-dioxotetrahydroquinazoline.

References Cited

UNITED STATES PATENTS

| 3,244,503 | 4/1966 | Watts | 71—2.5 |
| 3,235,363 | 2/1966 | Luckenbaugh et al. | 71—2.5 |
| 3,330,640 | 7/1967 | Luckenbaugh | 71—92 |

ALEX MAZEL, Primary Examiner

A. M. T. TIGHE, Assistant Examiner

U.S. Cl. X.R.

71—92